United States Patent [19]

Tanimura et al.

[11] 4,409,359
[45] Oct. 11, 1983

[54] SEALING COMPOUND FOR CAN ENDS

[75] Inventors: Yusaburo Tanimura, Kawasaki; Hideo Kumasaka, Yokosuka, both of Japan

[73] Assignee: Toyo Seikan Kaisha, Ltd., Tokyo, Japan

[21] Appl. No.: 347,713

[22] Filed: Feb. 10, 1982

[30] Foreign Application Priority Data

Feb. 13, 1981 [JP] Japan ................................. 56-18966

[51] Int. Cl.³ ........................... C08L 7/00; C08L 9/00
[52] U.S. Cl. .................................... 524/575; 428/462; 523/100; 524/46; 524/274; 524/446; 524/457; 524/459
[58] Field of Search ............... 524/575, 457, 459, 270, 524/271, 274, 46, 446; 523/100; 428/462

[56] References Cited

U.S. PATENT DOCUMENTS

| | | | |
|---|---|---|---|
| 2,927,864 | 3/1960 | Shotton | 523/100 |
| 3,767,607 | 10/1973 | Schneider | 524/274 |
| 3,950,280 | 4/1976 | Singleton | 523/100 |
| 3,998,778 | 12/1976 | Berg et al. | 524/575 |
| 4,032,492 | 7/1977 | Englund et al. | 523/100 |
| 4,128,185 | 12/1978 | Wszolek | 523/100 |
| 4,213,888 | 7/1980 | Karg et al. | 524/575 |
| 4,272,419 | 6/1981 | Force | 524/575 |
| 4,278,718 | 7/1981 | Billings et al. | 523/100 |

Primary Examiner—Ronald W. Griffin
Attorney, Agent, or Firm—Sherman & Shalloway

[57] ABSTRACT

Disclosed is a sealing compound for can ends excellent in the adaptability to the lining operation, which comprises an aqueous latex of a styrene-butadiene rubber, a tackifier and a filler, wherein said latex contains styrene-butadiene rubber particles having a number average particle size of from 1600 to 3000 Å, which are stabilized by an emulsifier or a dispersant.

8 Claims, 2 Drawing Figures

SEALING COMPOUND FOR CAN ENDS

BACKGROUND OF THE INVENTION (1) Field of the Invention

The present invention relates to a sealing compound excellent in the adaptability to the lining operation. More particularly, the present invention relates to an improvement in a sealing compound comprising as the main ingredient an aqueous latex of a styrene-butadiene rubber.

(2) Description of the Prior Art

In the conventional process for the manufacture of cans, a liquid sealing composition called "sealing compound" is lined in an annular groove of a can end member (can lid), and a sealing compound layer (gasket) is thus formed, if necessary, by drying. Then, the can end member is double-seamed to a flange of a can body to form a can.

This sealing compound comprises as the main ingredient an aqueous latex of a styrene-butadiene rubber (SBR) which contains styrene-butadiene rubber particles ordinarily having a number average particle size of from 1200 to 1500 Å. When this known sealing compound is lined on a can lid at a relatively low speed, for example, of 20 to 150 strokes per minute, satisfactory results are generally obtained. However, it has been found that when the lining operation is carried out at a relatively high speed, for example, of 180 to 400 strokes per minute, problems arise in connection with the adaptability of this known sealing compound to the lining operation and the sealing performance and other qualities of the formed gasket.

More specifically, the above-mentioned latex-based sealing compound is lined in a groove formed on a can lid through an openable and closable nozzle, and the sealing compound undergoes a mechanical friction by sliding or the like repeatedly between a needle for opening and closing this nozzle and a leakage-preventing packing arranged along this needle. This mechanical friction is increased as the lining stroke number per minute is increased, and with increase of this mechanical friction, the temperature of the sealing compound is elevated.

In the above-mentioned conventional sealing compound, at the time of the high speed lining operation, agglomerates of the rubber particles are formed and coagulated by the mechanical friction and/or the elevation of the temperature, and simultaneously, the viscosity of the sealing compound is increased. As the result of that long-time continuous lining operation becomes impossible and the adaptability to the lining operation is degraded. Furthermore, the sealing performance of the formed gasket becomes insufficient and other qualities and properties of the gasket are degraded.

SUMMARY OF THE INVENTION

We found that when an aqueous latex of styrene-butadiene rubber particles having a number average particle size of from 1600 to 3000 Å is selected and used as the aqueous latex for the sealing compound, formation of agglomerates and abnormal increase of the viscosity by the above-mentioned mechanical friction or temperature elevation at the high speed lining operation can be effectively controlled, and the adaptability to the lining operation can be prominently improved, and the above-mentioned defects can be eliminated effectively. The present invention is based on this finding.

More specifically, in accordance with the present invention, there is provided a sealing compound for can ends which is highly adaptable to the lining operation, which comprises an aqueous latex of a styrene-butadiene rubber, a tackifier and a filler, wherein said latex contains styrene-butadiene rubber particles having a number average particle size of from 1600 to 3000 Å, which are stabilized by an emulsifier or a dispersant.

Incidentally, by the term "number average particle size" used in the instant specification and appended claims is meant a mean value of particle sizes determined according to the electron micrography method.

DETAILED DESCRIPTION OF THE PREFERRED EMBODIMENTS

Figure 1:
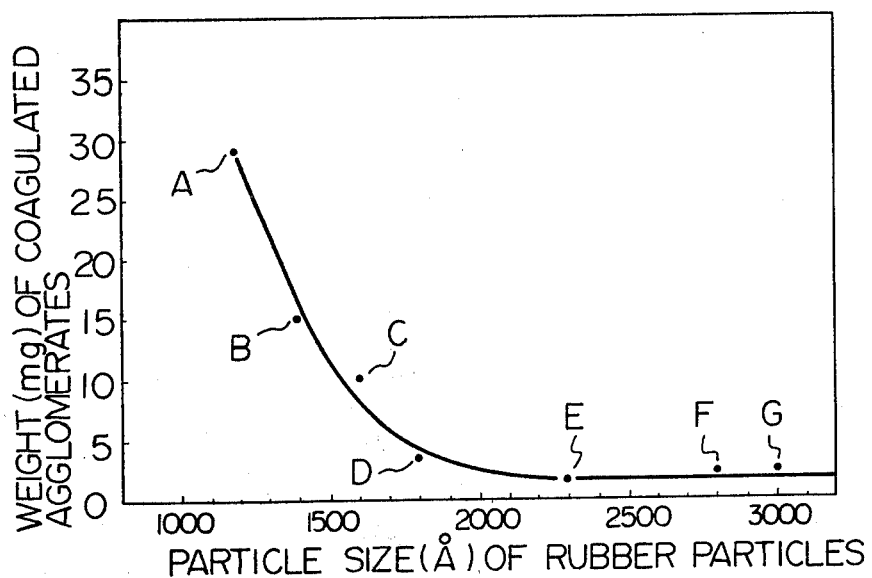
FIG. 1 is a graph illustrating the relation between the number average particle size of SBR particles and the weight of coagulated agglomerates.
Figure 2:
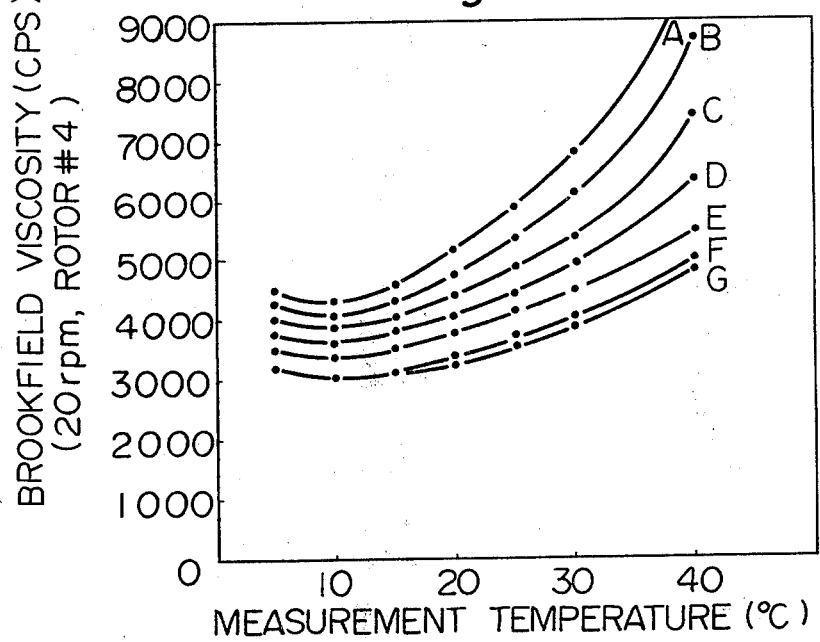
FIG. 2 is a graph illustrating the relation between the liquid temperature of a composition comprising an SBR latex and the Brookfield viscosity of the composition.

In the present invention, as the styrene-butadiene rubber (hereinafter referred to as "SBR") latex, there is used a latex of SBR particles having a number average particle size of from 1600 to 3000 Å, especially from 1800 to 2800 Å. This condition is critical for obtaining a sealing compound having a good adaptability to the lining operation, which will readily be understood from FIGS. 1 and 2 of the accompanying drawings. FIG. 1 shows the relation between the number average particle size (Å) of SBR particles and the weight of coagulated agglomerates, which is observed when a SBR latex-based sealing compound is subjected to the JIS mechanical stability test. From FIG. 1, it will readily be understood that if a latex having a number average particle size within the above-mentioned range is selected and used, formation of agglomerates can prominently be controlled as compared with the conventional sealing compounds A and B. FIG. 2 shows the relation between the liquid temperature and the Brookfield viscosity, (rotor #4, rotated at 20 rpm, unit: cps) of the above-mentioned SBR latex-based sealing compound. It is considered that a viscosity of 3000 to 6000 cps is suitable for the adaptability of a sealing compound to the high speed lining operation. From FIG. 2, it is seen that in the conventional sealing compounds A and B, the range of the temperatures giving an appropriate viscosity is considerably narrow, whereas when an SBR latex has a number average particle size within the range specified in the present invention, the applicable temperature range can be broadened remarkably and the adaptability to the lining operation can be remarkably improved.

The effects of improving the mechanical stability and temperature stability of the sealing compound by adjusting the SBR particle size within the above-mentioned range according to the present invention are irrelevant to the mechanical stability and temperature stability of the SBR latex per se. And these effects are attained for the first time when a sealing compound is formed by incorporating a tackifier, a filler, a thickener and an emulsifier or dispersant into the SBR latex. When the particle size is changed in the SBR latex and it is subjected to the JIS mechanical stability test, it is seen that agglomerates are hardly formed if the number average particle size is in the range of from 1200 to 3000 Å. When the temperature dependency of the Brookfield viscosity of the SBR latex per se is examined, it is seen that there is no substantial temperature dependency of the Brookfield viscosity, or there is rather observed a negative temperature dependency. From the foregoing facts, it will be readily understood that the tendency of reduction of the mechanical stability or temperature stability of latex rubber particles at the high speed lining operation is observed for the first time when they are formed into a sealing compound by incorporation of a tackifier, a filler, a thickener and an emulsifier or dispersant, and it will also be understood that according to the present invention, by increasing the particle size of SBR latex particles beyond the customarily adopted particle size, the above-mentioned problems inherently involved in sealing compounds for the lining operation can be solved.

In the present invention, any of SBR latices prepared according to known methods can optionally be used, as long as the number average particle size of latex particles is within the above-mentioned range. An SBR latex is ordinarily obtained by emulsion-polymerizing styrene and butadiene in an aqueous medium in the presence of an emulsifier or dispersant. Two kinds of SBR latices, that is, a cold rubber (obtained at a polymerization temperature lower than about 10° C.) and a hot rubber (obtained at a polymerization temperature of 35° to 70° C.), are obtained according to the polymerization temperature. Either the cold rubber or the hot rubber can be used in the present invention. However, since a relatively large amount of a polymerization inhibitor is contained in the cold rubber, if the cold rubber is used, the polymerization inhibitor is included in the sealing compound and is apt to have bad influences on the flavor of the content packed in a can. Accordingly, in the present invention, it is preferred that a hot rubber obtained by carrying out emulsion polymerization at 35° to 70° C. should be used as the SBR latex.

In order to impart an optimal combination of the elastic and plastic properties to the SBR-based sealing compound, it is preferred that in forming SBR, styrene and butadiene should be copolymerized at a weight ratio of from 28/72 to 55/45, especially from 35/65 to 55/45.

For adjustment of the number average particle size of SBR particles within the above-mentioned range, there can be adopted the following methods, though applicable methods are not limited to those described below.

Method I

In the emulsion polymerization, the amounts charged of the emulsifier or dispersant and water are reduced, and also the amount of the polymerization initiator is reduced and the polymerization rate is lowered.

Method II

A small amount of ammonium chloride-ammonia is added to the latex to form an ammonia soap, and the particle size is coarsened at the heating condensation step.

Method III

A solution of an electrolyte such as sodium chloride is added to the latex while keeping the amount of the soap and the pH value constant in the latex, or the amount of the soap is reduced, thereby to form an unstable latex, and then, the latex is cooled and frozen at a temperature lower than 0° C. in a short time and is then thawed.

Examples of the latex recipe that can be adopted in the foregoing methods are described on page 198 of "Handbook of Synthetic Rubbers" published on Nov. 30, 1967, and the incorporation ratios of the respective additives and the operation conditions are adjusted so that the number average particle size is included in the above-mentioned range.

It is ordinarily preferred that the latex that is used in the present invention should have a solid content of 40 to 70% by weight and a pH value of 9.5 to 10.5.

In addition to the above-mentioned SBR latex, the sealing compound of the present invention comprises as indispensable ingredients a tackifier for improving the adhesion to a coating or metal substrate and thus improving the sealing performance, and a filler for imparting a good compressive elasticity to the sealing compound and improving the drying property.

As preferred examples of the tackifier, there can be mentioned rosin type resins such as rosin, hydrogenated rosin, rosin esters, hydrogenated rosin esters and hardened rosin; terpene resins; phenol-formaldehyde resins; phenolic resins modified with a natural resin such as rosin or terpene; xylene-formaldehyde resins; modified resins thereof and petroleum resins. The tackifier is used in an amount of 5 to 200 parts by weight, especially 20 to 140 parts by weight, per 100 parts by weight of solids of the SBR latex.

As preferred examples of the filler, there can be mentioned siliceous fillers such as colloidal silica, silicic anhydride, hydrous silicic acid and synthetic silicates, light calcium carbonate, heavy calcium carbonate, activated calcium carbonate, kaolin, calcined clay, alumina white, talc powder, dolomite, aluminum sulfate, barium sulfate, magnesium carbonate, magnesium silicate, magnesium oxide; calcium sulfate, pumice powder; glass powder; asbestos powder; zinc oxide; titanium dioxide and carbon black. The filler is used in an amount of 30 to 200 parts by weight, especially 50 to 150 parts by weight, per 100 parts by weight of solids of the SBR latex.

The sealing compound of the present invention further comprises an emulsifier or dispersant inherently contained in the SBR latex or independently added. As preferred examples of the emulsifier or dispersant, there can be mentioned fatty acids such as oleic acid, stearic acid, palmitic acid, lauric acid and myristic acid, resin acids such as rosin acid; organic sulfonic acids such as alkylaryl sulfonic acids, sulfonic acids of dibasic fatty acid esters and sulfonic acids of aliphatic amides, and sodium, potassium and ammonium salts of these acids. The emulsifier or dispersant is present in an amount of 3.5 to 9.5 parts by weight, especially 4 to 6 parts by weight, per 100 parts by weight of solids of the SBR latex. Since only a relatively small amount of the emulsifier or dispersant is contained in the SBR latex having a relatively large particle size, which is used in the present invention, it is ordinarily preferred that an additional amount of the emulsifier or dispersant is simultaneously incorporated when the tackifier and filler are added to the SBR latex.

Since the viscosity of the sealing compound of the present invention is generally low, from the viewpoint of the adaptability to the lining operation, it is preferred that a thickener composed of a water-soluble polymer is incorporated into the sealing compound of the present invention. As preferred examples of the thickener, there can be mentioned methyl cellulose, hydroxypropylmethyl cellulose, hydroxyethyl cellulose, carboxymethyl cellulose, sodium alginate, polyvinyl alcohol, sodium polyacrylate and karaya gum. The thickener is preferably used in an amount of 2 to 12 parts by weight, per 100 parts by weight of solids of the SBR latex.

Furthermore, other additives such as an antioxidant and a hydrogen ion adjusting agent may optionally be incorporated into the sealing compound of the present invention according to known recipes.

The present invention will now be described in detail with reference to the following example that by no means limits the scope of the present invention.

EXAMPLE 1

Composition of Sealing Compound

| Ingredient | Parts by Weight |
| --- | --- |
| Rubber (SBR) | 100.0 |
| Filler (clay and titanium dioxide) | 100.0 |
| Tackifier (rosin type resin) | 80.0 |
| Thickener (methyl cellulose and karaya gum) | 5.0 |
| Emulsifier or dispersant (rosin acid soap and fatty acid soap) | 4.5 |
| Antioxidant | 1.0 |
| Water | 435.0 |
| Solid content | 40.0% by weight |
| pH Value | 10.0 |

Seven sealing compounds A through G having the above composition but being different in the particle size of rubber particles were prepared and were tested according to the JIS latex mechanical stability test method, that is, the synthetic rubber NBR latex mechanical stability test method 4.6 according to JIS K 6392-1976.

More specifically, 100 g of a sample was collected at normal temperature and stirred at 1000 rpm under a load of 10 Kg for 1 hour. The weight of coagulated agglomerates was measured and the mechanical stability was evaluated based on the measured weight.

The obtained results are shown in Table 1.

TABLE 1

Results of JIS Mechanical Stability Test of Sealing Compounds

| Sealing | Particle Size (Å) of Rubber Particles | Weight (mg) of Coagulated Agglomerates |
| --- | --- | --- |
| A | 1200 | 29 |
| B | 1400 | 15 |
| C | 1600 | 10 |
| D | 1800 | 3.5 |
| E | 2300 | 1.7 |
| F | 2800 | 2.0 |
| G | 3000 | 2.5 |

From the results shown in Table 1, it will readily be understood that if the particle size of the rubber particles is at least 1600 Å, especially at least 1800 Å, the amount of coagulated agglomerates is drastically reduced.

Then, the foregoing sealing compounds were examined with respect to the temperature dependency of the viscosity according to the following procedures.

More specifically, 200 ml of a sample was charged in a beaker and the viscosity (unit: cps) was measured by a Brookfield viscometer provided with a rotor #4 rotated at 20 rpm.

The obtained results are shown in Table 2.

TABLE 2

Temperature Dependency of Viscosity (cps)

| Sealing Compound | Measurement Temperature (°C.) | | | | | | |
| --- | --- | --- | --- | --- | --- | --- | --- |
| | 5 | 10 | 15 | 20 | 25 | 30 | 40 |
| A | 4500 | 4300 | 4600 | 5200 | 5900 | 6800 | 10800 |
| B | 4300 | 4100 | 4300 | 4700 | 5300 | 6100 | 8700 |
| C | 4000 | 3900 | 4000 | 4400 | 4900 | 5400 | 7400 |
| D | 3800 | 3600 | 3800 | 4000 | 4400 | 5000 | 6400 |
| E | 3500 | 3400 | 3500 | 3800 | 4100 | 4500 | 5500 |
| F | 3200 | 3000 | 3100 | 3400 | 3600 | 4000 | 5000 |
| G | 3200 | 3000 | 3100 | 3300 | 3500 | 3900 | 4800 |

Furthermore, the foregoing sealing compounds were tested with respect to the adaptability to the actual lining operation. The obtained results are shown in Table 3.

TABLE 3

| Sealing Compound | Particle Size (Å) of Rubber Particles | Low Speed Lining Operation (125 strokes per minute) | High Speed lining Operation (250 strokes per minute) |
| --- | --- | --- | --- |
| A | 1200 | F | VP |
| B | 1400 | F | P |
| C | 1600 | G | F |
| D | 1800 | G | G |
| E | 2300 | G | G |
| F | 2800 | G | G |
| G | 3000 | G | G |

The symbols in Table 3 have the following meanings.
VP: 3 to 10 hours' continuous lining operation was possible
P: 14 to 28 hours' continuous lining operation was possible
F: 49 to 70 hours' continuous lining operation was possible
G: 100 to 200 hours' continuous lining operation was possible

What is claimed is:

1. A sealing compound for can ends excellent in the adaptability to the lining operation, which comprises an aqueous latex of a styrene-butadiene rubber, a tackifier and a filler, wherein said latex contains styrene-butadiene rubber particles having a number average particle size of from 1600 to 3000 Å, which are stabilized by an emulsifier or a dispersant.

2. A sealing compound as set forth in claim 1, wherein the number average particle size of the styrene-butadiene rubber particles is in the range of from 1800 to 2800 Å.

3. A sealing compound as set forth in claim 1, wherein the styrene-butadiene rubber contains styrene and butadiene at a weight ratio of from 28/72 to 55/45.

4. A sealing compound as set forth in claim 1 or 3, wherein said latex comprises styrene-butadiene rubber particles obtained by emulsion-polymerizing styrene and butadiene at a temperature of 35° to 70° C.

5. A sealing compound as set forth in claim 1, wherein said latex contains the styrene-butadiene rubber particles at a solid concentration of 30 to 90% by weight.

6. A sealing compound as set forth in claim 1, wherein said latex has a pH value of from 9.5 to 10.5.

7. A sealing compound as set forth in claim 1, which further comprises a thickener composed of a water-soluble polymer in an amount of 2 to 12 parts by weight per 100 parts by weight of solids of the styrene-butadiene rubber.

8. A sealing compound as set forth in claim 1, which comprises a tackifier in an amount of 5 to 200 parts by weight, a filler in an amount of 30 to 200 parts by weight and an emulsifier or a dispersant in an amount of 3.5 to 9.5 parts by weight, per 100 parts by weight of solids of the styrene-butadiene rubber.

* * * * *